United States Patent
Dean et al.

(10) Patent No.: US 9,870,371 B2
(45) Date of Patent: *Jan. 16, 2018

(54) ASSOCIATING APPLICATION-SPECIFIC METHODS WITH TABLES USED FOR DATA STORAGE

(71) Applicant: Google Inc., Mountain View, CA (US)

(72) Inventors: Jeffrey A. Dean, Palo Alto, CA (US); Sanjay Ghemawat, Mountain View, CA (US); Andrew B. Fikes, Los Altos, CA (US); Yasushi Saito, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 820 days.

This patent is subject to a terminal disclaimer.

(21) Appl. No.: 13/938,126

(22) Filed: Jul. 9, 2013

(65) Prior Publication Data

US 2013/0297592 A1 Nov. 7, 2013

Related U.S. Application Data

(63) Continuation of application No. 12/247,984, filed on Oct. 8, 2008, now Pat. No. 8,484,351.

(51) Int. Cl.
*G06F 17/30* (2006.01)
*G06F 9/50* (2006.01)

(52) U.S. Cl.
CPC ...... *G06F 17/30194* (2013.01); *G06F 9/5083* (2013.01); *G06F 17/30212* (2013.01); *G06F 17/30312* (2013.01)

(58) Field of Classification Search
CPC .............. G06F 17/30212; G06F 17/30312
See application file for complete search history.

(56) References Cited

U.S. PATENT DOCUMENTS

| 5,386,559 A | 1/1995 | Eisenberg et al. |
| 5,414,834 A | 5/1995 | Alexander et al. |

(Continued)

FOREIGN PATENT DOCUMENTS

EP 0877327 B1 11/1998

OTHER PUBLICATIONS

Anonymous, Oracle 9i, database concepts, release 2 (9.2), part No. A96524-01, excerpt, chapters 2-3, Mar. 2002, 68 pgs.

(Continued)

*Primary Examiner* — Jeong S Park
(74) *Attorney, Agent, or Firm* — Morgan, Lewis & Bockius LLP

(57) ABSTRACT

A method of accessing data includes storing a table that includes a plurality of tablets corresponding to distinct non-overlapping table portions. Respective pluralities of tablet access objects and application objects are stored in a plurality of servers. A distinct application object and distinct tablet are associated with each tablet access object. Each application object corresponds to a distinct instantiation of an application associated with the table. The tablet access objects and associated application objects are redistributed among the servers in accordance with a first load-balancing criterion. A first request directed to a respective tablet is received from a client. In response, the tablet access object associated with the respective tablet is used to perform a data access operation on the respective tablet, and the application object associated with the respective tablet is used to perform an additional computational operation to produce a result to be returned to the client.

23 Claims, 13 Drawing Sheets

(56) References Cited

U.S. PATENT DOCUMENTS

| | | | |
|---|---|---|---|
| 5,668,352 A | 9/1997 | Christian et al. | |
| 5,729,730 A | 3/1998 | Wlaschin et al. | |
| 5,794,228 A | 8/1998 | French et al. | |
| 5,856,826 A | 1/1999 | Craycroft | |
| 5,918,225 A | 6/1999 | White et al. | |
| 5,937,402 A | 8/1999 | Pandit | |
| 5,946,699 A | 8/1999 | Sawashima et al. | |
| 5,953,503 A | 9/1999 | Mitzenmacher et al. | |
| 6,006,232 A | 12/1999 | Lyons | |
| 6,169,990 B1 | 1/2001 | McGregor et al. | |
| 6,182,121 B1 | 1/2001 | Wlaschin | |
| 6,233,580 B1 | 5/2001 | Kaplan et al. | |
| 6,289,358 B1 | 9/2001 | Mattis et al. | |
| 6,298,342 B1 | 10/2001 | Graefe et al. | |
| 6,374,256 B1* | 4/2002 | Ng | G06F 9/4435 707/741 |
| 6,430,549 B1 | 8/2002 | Gershfield et al. | |
| 6,446,092 B1* | 9/2002 | Sutter | G06F 17/30578 |
| 6,453,313 B1 | 9/2002 | Klein et al. | |
| 6,618,737 B2 | 9/2003 | Aridor et al. | |
| 6,636,870 B2 | 10/2003 | Roccaforte | |
| 6,725,225 B1 | 4/2004 | Kori | |
| 6,728,727 B2 | 4/2004 | Komine et al. | |
| 6,778,996 B2 | 8/2004 | Roccaforte | |
| 6,879,984 B2 | 4/2005 | Duddleson et al. | |
| 6,909,384 B2 | 6/2005 | Baldwin et al. | |
| 6,937,171 B2 | 8/2005 | Baldwin et al. | |
| 7,013,304 B1 | 3/2006 | Schuetze et al. | |
| 7,024,414 B2 | 4/2006 | Sah et al. | |
| 7,026,964 B2 | 4/2006 | Baldwin et al. | |
| 7,028,039 B2 | 4/2006 | Burrows et al. | |
| 7,085,768 B2 | 8/2006 | Scott et al. | |
| 7,103,588 B2 | 9/2006 | Beck et al. | |
| 7,103,608 B1 | 9/2006 | Ozbutun et al. | |
| 7,181,457 B2 | 2/2007 | Reinauer et al. | |
| 7,237,062 B2 | 6/2007 | Lubbers et al. | |
| 8,484,351 B1* | 7/2013 | Dean | G06F 17/30194 709/226 |
| 2002/0038301 A1 | 3/2002 | Aridor et al. | |
| 2002/0147849 A1* | 10/2002 | Wong | G06F 17/30067 709/246 |
| 2002/0178171 A1 | 11/2002 | Walker et al. | |
| 2003/0200235 A1 | 10/2003 | Choy et al. | |
| 2003/0204534 A1 | 10/2003 | Hopeman et al. | |
| 2004/0025035 A1 | 2/2004 | Jean-Claude et al. | |
| 2004/0148301 A1 | 7/2004 | McKay et al. | |
| 2004/0225673 A1 | 11/2004 | Beck et al. | |
| 2004/0236728 A1 | 11/2004 | Newman et al. | |
| 2005/0071336 A1 | 3/2005 | Najork et al. | |
| 2005/0120293 A1 | 6/2005 | Benhase et al. | |
| 2005/0149584 A1 | 7/2005 | Bourbonnais et al. | |
| 2005/0219076 A1 | 10/2005 | Harris | |
| 2006/0123035 A1 | 6/2006 | Ivie | |
| 2006/0129609 A1 | 6/2006 | Kunze | |
| 2007/0033354 A1* | 2/2007 | Burrows | G06F 17/30085 711/156 |
| 2008/0084880 A1 | 4/2008 | Dharwadkar | |
| 2009/0019013 A1* | 1/2009 | Tareen | G06F 17/30722 |
| 2009/0091899 A1 | 4/2009 | Ward et al. | |

OTHER PUBLICATIONS

Anonymous, Oracle database performance tuning guide 10g release 1 (10.1), TOC, Chap 4, 7, 8, Dec. 2003, 98 pgs.
Antoshenkov, Dictionary-based order preserving string compression, Feb. 1997, 14 pgs.
Barroso, Memory system characterization of commercial workloads, Jun. 1998, 12 pgs.
Bauer, Data-Warehouse-Systeme, Jan. 1, 2001, 63 pgs (in German).
Bell, Compression of sparse matrices by arthmetic coding, Mar. 30-Apr. 1, 1998, 10 pgs.
Bentley, Data compression using long common strings, Mar. 1999, 9 pgs.
Bobrowski, Oracle8 architecture, passage, 1998, 9 pgs.
Chang, Bigtable: A distributed storage system for structured data, 2006, 14 pgs.
Chen, Query optimization in compressed database systems, 2001, 12 pgs.
Elmasri, Database security and authorization, Ch. 23 of fundamentals of database systems, pp. 731-754, 2004.
Elmasri, Portions of chapters 24 and 25 of fundamentals of database systems, 2004, pp. 767-819.
Gamal-Eldin, Integrating relational databases with support for updates, Dec. 5, 1988, 8 pgs.
Google Inc., ESR, EP 08007412.3, dated Mar. 27, 2009, 2 pgs.
Google Inc., Extended ESR, EP 11190394.4, dated Feb. 29, 2012, 4 pgs.
Google Inc., ISR/WO, PCT/US2006/028236, dated Feb. 8, 2007, 12 pgs.
Google Inc., Office Action, EP 08007412.3, dated Feb. 29, 2012, 8 pgs.
Grembowicz, Contents, Oracle database cache concepts and administration guide, Jan. 1, 2001.
Kouramajian, Mapping of 2-D temporal extended ER models in termporal FNF and NFNF relational models, Oct. 23, 1991, 19 pgs.
Oracle Corporation, Oracle9i replication, Jun. 2001, 15 pgs.

\* cited by examiner

Table Metadata
500

| TableID | Table Name | Other Per Table Parameters | 502 |
|---|---|---|---|
| TableID | Table Name | Other Per Table Parameters | 502 |

Tablet Metadata (Table)
510

| TableID | LastRow of Tablet | Server Loc | Tablet State | Load Metric | Load Metric | Load Metric | ••• | 512 |
|---|---|---|---|---|---|---|---|---|
| TableID | LastRow of Tablet | Server Loc | Tablet State | Load Metric | Load Metric | Load Metric | ••• | 512 |

Tablet Log (Table)
530

| Tablet ID | Memory Location | Memory Location | Memory Location | 532 |
|---|---|---|---|---|
| Tablet ID | Memory Location | Memory Location | Memory Location | 532 |

Server Load Metrics (Table)
540

| ServerID | Load Metric | Load Metric | Load Metric | ••• | 542 |
|---|---|---|---|---|---|
| ServerID | Load Metric | Load Metric | Load Metric | ••• | 542 |

752
Store first and second table data structures in a file system. Each table data structure includes a plurality of tablets that correspond to distinct non-overlapping table portions. The first and second table data structures have distinct schemas.

754
Store in a plurality of servers a plurality of tablet access objects, a plurality of first application objects, and a plurality of second application objects. Each tablet access object is associated with either a distinct first application object or a distinct second application object.

Each first application object and associated tablet access object are associated with and distinct from a respective tablet of the first table data structure. Each first application object corresponds to a distinct instantiation of a first application associated with the first table data structure.

Each second application object and associated tablet access object are associated with and distinct from a respective tablet of the second table data structure. Each second application object corresponds to a distinct instantiation of a second application associated with the second table data structure.

756
Redistribute the tablet access objects and associated first or second application objects among the plurality of servers in accordance with a first load-balancing criterion.

758
Receive from a first client a first request directed to a first tablet in the first table data structure.

Figure 7E

ASSOCIATING APPLICATION-SPECIFIC METHODS WITH TABLES USED FOR DATA STORAGE

RELATED APPLICATIONS

This application is a continuation of U.S. application Ser. No. 12/247,984, titled "Associating Application-Specific Methods with Tables Used for Data Storage," filed Oct. 8, 2008, which is hereby incorporated by reference in its entirety.

TECHNICAL FIELD

The disclosed embodiments relate generally to managing data storage and retrieval, and more particularly, to a method and system for co-locating application-specific computational processing with access to data to be processed.

BACKGROUND

Performing computations involving data stored in tables in a distributed computing system presents significant engineering challenges. A single request from a client might involve data stored in multiple table portions. Access to each table portion storing requested data may be controlled by various processes spread over multiple servers. Furthermore, the loads on the various processes and their respective servers may vary across the system, resulting in inefficiencies. Accordingly, it is desirable to provide an efficient manner of performing computations involving data stored in tables in a distributed computing system, while also performing load balancing.

SUMMARY

In some embodiments, a method of accessing data includes storing a table data structure in a file system. The table data structure includes a plurality of tablets that correspond to distinct non-overlapping table portions. A plurality of tablet access objects and a plurality of application objects are stored in a plurality of servers, wherein a distinct application object is associated with each tablet access object. Furthermore, each application object and the associated tablet access object are associated with and distinct from a respective tablet of the table data structure. Each application object corresponds to a distinct instantiation of an application associated with the table data structure. The tablet access objects and the associated application objects are redistributed among the plurality of servers in accordance with a first load-balancing criterion. A first request directed to a respective tablet is received from a client. In response to the first request, the tablet access object associated with the respective tablet is used to perform a data access operation on the respective tablet, and the application object associated with the respective tablet is used to perform an additional computational operation to produce a result to be returned to the client.

In some embodiments, a system for accessing data includes, in a set of interconnected computers: memory, a plurality of processors, and one or more programs stored in the memory and configured for execution by the plurality of processors. The one or more programs include instructions to store a table data structure in a file system. The table data structure includes a plurality of tablets that correspond to distinct non-overlapping table portions. The one or more programs also include instructions to store, in a plurality of the interconnected computers, a plurality of tablet access objects and a plurality of application objects. A distinct application object is associated with each tablet access object. Each application object and the associated tablet access object are associated with and distinct from a respective tablet of the table data structure. Each application object corresponds to a distinct instantiation of an application associated with the table data structure. The one or more programs further include: instructions to redistribute the tablet access objects and the associated application objects among the plurality of the interconnected computers in accordance with a first load-balancing criterion; instructions to receive a first request directed to a respective tablet from a client; and instructions to use the tablet access object associated with the respective tablet to perform a data access operation on the respective tablet, and to use the application object associated with the respective tablet to perform an additional computational operation to produce a result to be returned to the client, in response to the first request.

In some embodiments, a computer readable storage medium stores one or more programs for use in accessing data. The one or more programs are configured to be executed by a set of interconnected computers and include instructions to store a table data structure in a file system. The table data structure includes a plurality of tablets that correspond to distinct non-overlapping table portions. The one or more programs also include instructions to store, in a plurality of the interconnected computers, a plurality of tablet access objects and a plurality of application objects. A distinct application object is associated with each tablet access object. Each application object and the associated tablet access object are associated with and distinct from a respective tablet of the table data structure. Each application object corresponds to a distinct instantiation of an application associated with the table data structure. The one or more programs further include: instructions to redistribute the tablet access objects and the associated application objects among the plurality of the interconnected computers in accordance with a first load-balancing criterion; instructions to receive a first request directed to a respective tablet from a client; and instructions to use the tablet access object associated with the respective tablet to perform a data access operation on the respective tablet, and to use the application object associated with the respective tablet to perform an additional computational operation to produce a result to be returned to the client, in response to the first request.

In some embodiments, a method of accessing data includes storing first and second table data structures in a file system. Each table data structure includes a plurality of tablets that correspond to distinct non-overlapping table portions. The first and second table data structures have distinct schemas. A plurality of tablet access objects, a plurality of first application objects, and a plurality of second application objects are stored in a plurality of servers. Each tablet access object is associated with either a distinct first application object or a distinct second application object. Each first application object and associated tablet access object are associated with and distinct from a respective tablet of the first table data structure, wherein each first application object corresponds to a distinct instantiation of a first application associated with the first table data structure. Each second application object and associated tablet access object are associated with and distinct from a respective tablet of the second table data structure, wherein each second application object corresponds to a distinct instantiation of a second application associated with the second table data structure. The tablet access objects and associated first or second application objects are redistributed among the plurality of servers in accordance with a first load-balancing criterion. A first request directed to a first tablet in the first table data structure is received from a first client. In response to the first request, the tablet access object associated with the first tablet is used to perform a data access operation on the first tablet, and the first application object associated with the first tablet is used to perform an additional computational operation to produce a result to be returned to the first client. A second request directed to a second tablet in the second table data structure is received from a second client. In response to the second request, the tablet access object associated with the second tablet is used to perform a data access operation on the second tablet, and the second application object associated with the second tablet is used to perform an additional computational operation to produce a result to be returned to the second client.

In some embodiments, a system for accessing data includes, in a set of interconnected computers: memory, a plurality of processors, and one or more programs stored in the memory and configured for execution by the plurality of processors. The one or more programs include instructions to store first and second table data structures in a file system. Each table data structure includes a plurality of tablets that correspond to distinct non-overlapping table portions. The first and second table data structures have distinct schemas. The one or more programs also include instructions to store in a plurality of servers a plurality of tablet access objects, a plurality of first application objects, and a plurality of second application objects. Each tablet access object is associated with either a distinct first application object or a distinct second application object. Each first application object and associated tablet access object are associated with and distinct from a respective tablet of the first table data structure, wherein each first application object corresponds to a distinct instantiation of a first application associated with the first table data structure. Each second application object and associated tablet access object are associated with and distinct from a respective tablet of the second table data structure, wherein each second application object corresponds to a distinct instantiation of a second application associated with the second table data structure. The one or more programs further include: instructions to redistribute the tablet access objects and associated first or second application objects among the plurality of servers in accordance with a first load-balancing criterion; instructions to receive from a first client a first request directed to a first tablet in the first table data structure; instructions to use the tablet access object associated with the first tablet to perform a data access operation on the first tablet, and to use the first application object associated with the first tablet to perform an additional computational operation to produce a result to be returned to the first client, in response to the first request; instructions to receive from a second client a second request directed to a second tablet in the second table data structure; and instructions to use the tablet access object associated with the second tablet to perform a data access operation on the second tablet, and to use the second application object associated with the second tablet to perform an additional computational operation to produce a result to be returned to the second client, in response to the second request.

In some embodiments, a computer readable storage medium stores one or more programs for use in accessing data. The one or more programs are configured to be executed by a set of interconnected computers and include instructions to instructions to store first and second table data structures in a file system. Each table data structure includes a plurality of tablets that correspond to distinct non-overlapping table portions. The first and second table data structures have distinct schemas. The one or more programs also include instructions to store in a plurality of servers a plurality of tablet access objects, a plurality of first application objects, and a plurality of second application objects. Each tablet access object is associated with either a distinct first application object or a distinct second application object. Each first application object and associated tablet access object are associated with and distinct from a respective tablet of the first table data structure, wherein each first application object corresponds to a distinct instantiation of a first application associated with the first table data structure. Each second application object and associated tablet access object are associated with and distinct from a respective tablet of the second table data structure, wherein each second application object corresponds to a distinct instantiation of a second application associated with the second table data structure. The one or more programs further include: instructions to redistribute the tablet access objects and associated first or second application objects among the plurality of servers in accordance with a first load-balancing criterion; instructions to receive from a first client a first request directed to a first tablet in the first table data structure; instructions to use the tablet access object associated with the first tablet to perform a data access operation on the first tablet, and to use the first application object associated with the first tablet to perform an additional computational operation to produce a result to be returned to the first client, in response to the first request; instructions to receive from a second client a second request directed to a second tablet in the second table data structure; and instructions to use the tablet access object associated with the second tablet to perform a data access operation on the second tablet, and to use the second application object associated with the second tablet to perform an additional computational operation to produce a result to be returned to the second client, in response to the second request.

BRIEF DESCRIPTION OF THE DRAWINGS

FIG. 5A is a block diagram of a data structure for storing metadata associated with a set of tables in accordance with some embodiments.

FIG. 5B is a block diagram of a data structure for storing metadata associated with tablets in a set of tables in accordance with some embodiments.

FIG. 5C is a block diagram of a data structure for a tablet log that records memory locations of tablets stored in a file system in accordance with some embodiments.

FIG. 5D is a block diagram of a data structure that records loads on various servers in a distributed computing system.

FIGS. 7A-7F are flow diagrams illustrating methods of accessing data in accordance with some embodiments.

Like reference numerals refer to corresponding parts throughout the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

Figure 1:
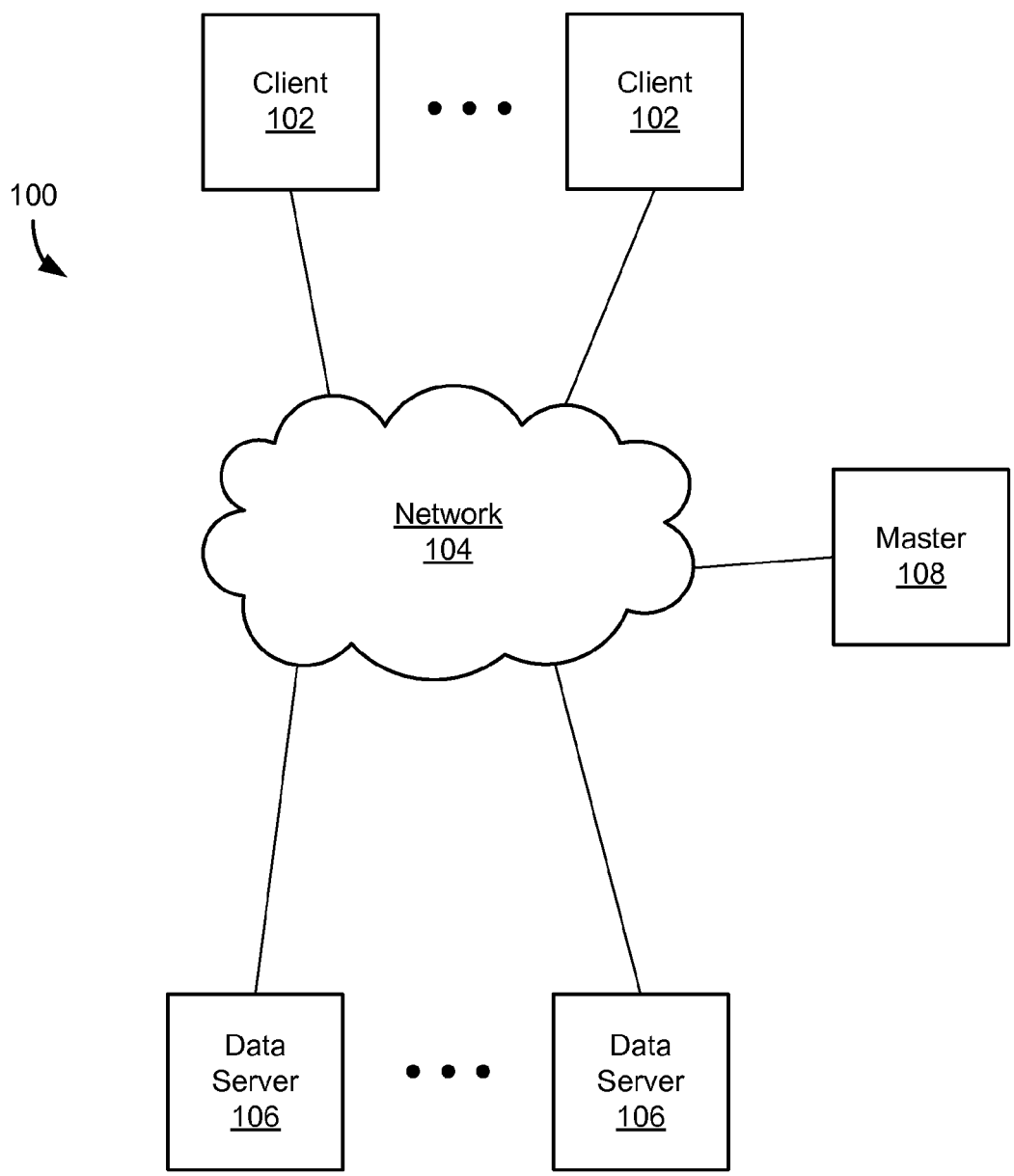
FIG. 1 illustrates a distributed computing and data storage system in accordance with some embodiments.

FIG. 1 illustrates a distributed computing and data storage system 100 in accordance with some embodiments. The system 100 includes a plurality of data servers 106 that store one or more table data structures ("tables") and are interconnected by a network 104. In some embodiments, a respective table is a sparse, distributed, persistent multidimensional sorted map and values in the map are uninterrupted arrays of bytes. In some embodiments, a respective table may scale to a petabyte or more of data. The system 100 distributes data for the one or more tables among the plurality of data servers 106. The network 104 may be any suitable network, including but not limited to a local area network (LAN), a wide-area network (WAN), the Internet, an Ethernet network, a virtual private network (VPN), or any combination of such networks. In some embodiments, data servers 106 are clustered in a data center or in two or more interconnected data centers. In some embodiments, the system 100 includes as many as 1000 servers or more.

In some embodiments, the operation of the plurality of the data servers 106 is coordinated by a master server 108. The master server 108 assigns and reassigns portions of the one or more tables to various data servers 106, monitors the status of each data server 106, and performs load balancing procedures.

Each portion of a respective table is referred to as a tablet. In some embodiments the tablets correspond to non-overlapping table portions. The master server 108 also assigns and reassigns to various data servers 106 responsibility for controlling access to tablets. In some embodiments, control of access to tablets is independent of tablet storage: a first data server 106 controls access to a tablet, while a separate data server stores the tablet. In some embodiments, the server that controls access to a tablet and the server that stores the tablet are situated in a common cluster of servers, or are situated such that latencies for data access operations are less than a predefined limit. In some embodiments, tablet storage is redundant. For example, a tablet may be stored on three different data servers 106. This redundant storage is handled by a file system and is independent of tablet access control.

The system 100 includes one or more client systems 102 that may query tables stored in the plurality of data servers 106. In some embodiments, each client system 102 executes an application that stores and manipulates data in a respective table in the system 100. For example, a client system 102 may query or write to a respective table by providing appropriate requests to the data servers 106 via the network 104. A client system also may instruct the data servers 106 to perform additional computational operations based on table data. In some embodiments, the additional computational operations are performed by the data server or servers 106 that control access to the respective table. The system 100 thus co-locates application processing with access to the data to be processed.

While client systems 102 are described as being separate from data servers 106, in some embodiments one or more client processes are executed by one or more of the data servers 106. Each client process executes an application that stores and manipulates data in a respective table in the system 100. For example, each client process may query or write to a respective table by providing appropriate requests to the corresponding data servers 106 via the network 104 and also may instruct data servers 106 to perform additional computational operations based on table data.

Figure 2:
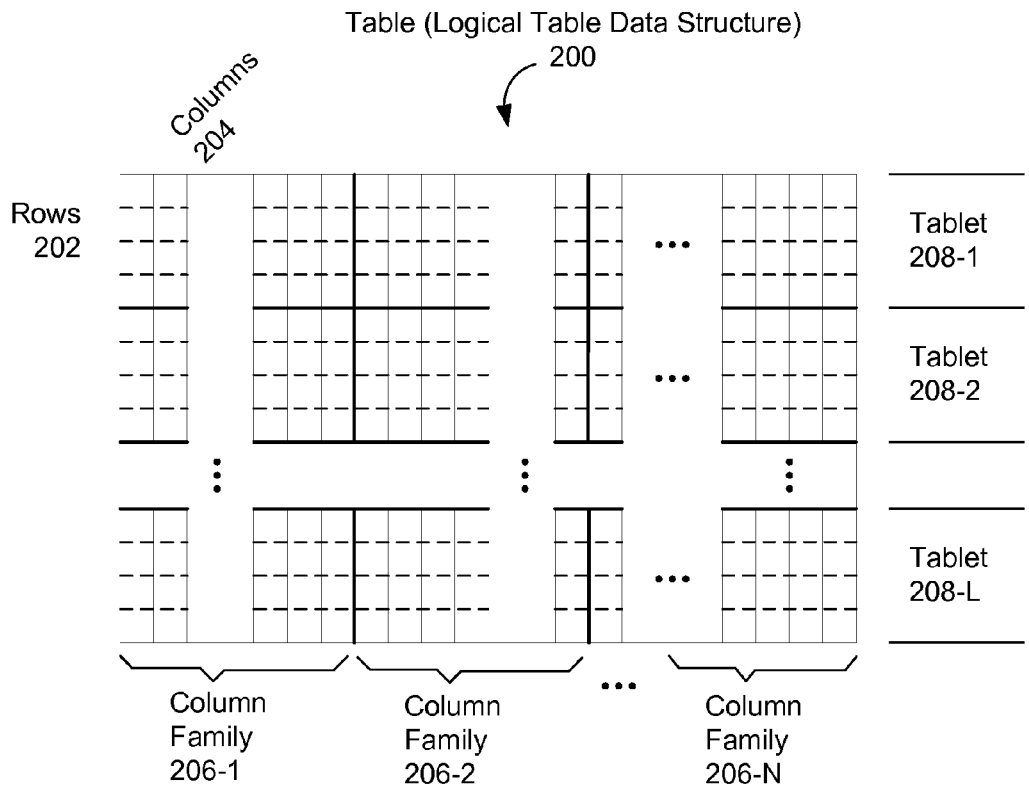
FIG. 2 is a conceptual block diagram of a table data structure in accordance with some embodiments.

FIG. 2 is a conceptual block diagram of a table 200 in accordance with some embodiments. The table 200 has rows 202 and columns 204 that index values stored in the table and that are identified by respective row and column identifiers. In some embodiments, the columns 204 are grouped into column families 206-1 through 206-N, where N is an integer indicating the number of column families in the table 200. Thus, each column family 206 includes one or more columns 204. In some embodiments, the column family is the basic unit for controlling accessing to data. Thus, if the administrator of a table 200 wants to restrict access to the contents in a first set of columns 204, but to allow unrestricted or less restricted access to a second set of columns 204, the columns 204 in the first set are assigned to a first column family 206 while the columns 204 in the second set are assigned to a second (i.e., different) column family 206.

Contiguous sets of the rows 202 are grouped to form tablets 208-1 through 208-L, where L is an integer indicating the number of tablets in the table 200. A tablet 208 thus contains all the data in a corresponding set of contiguous rows 202 in the table 200. The table 100 is sorted (at least conceptually) by row 202, as identified by respective row identifiers. Thus, if the contents of the table 200 were scanned from beginning to end, the contents would be accessed in row order. Existing tablets 208 can be split to increase the number of tablets 208, or merged to reduce the number of tablets 208. The tablet 208 is the basic logical unit of storage for purposes of distributing portions of a table 200 across a set of files. Tablets 208 are logical units of storage, as opposed to physical units of storage, because the content of a tablet 208 may be stored in multiple files.

In some embodiments, each row identifier is a string of arbitrary length and arbitrary value. Similarly, in some embodiments each column identifier is a string of arbitrary length and arbitrary value. In other words, in these embodiments, there are no length limitations and no (or few) value limitations placed on row and column identifiers. In some other embodiments, restrictions may be placed on the value of a row or column identifier. For example, the column identifier string may have to comply with a rule that disallows use of particular characters or symbols, or that requires the use of only printable characters or symbols. The rule may further disallow the use of a particular printable character, such as the colon character, except as a separator between first and second portions of the column identifier. In some embodiments, column names are segmented into a column family portion and a qualifier portion (sometimes called the column portion), separated by a predefined separator character or symbol. For example, a column name may have format such as cf1:c2, where the colon is the separator character. In these embodiments, the column family name and the qualifier portion of a column name can each be arbitrarily long and have arbitrary value; however the column family name may have to comply with a rule that disallows use of the predefined separator character in the column family name and/or in the qualifier portion of the column name.

Figure 3:
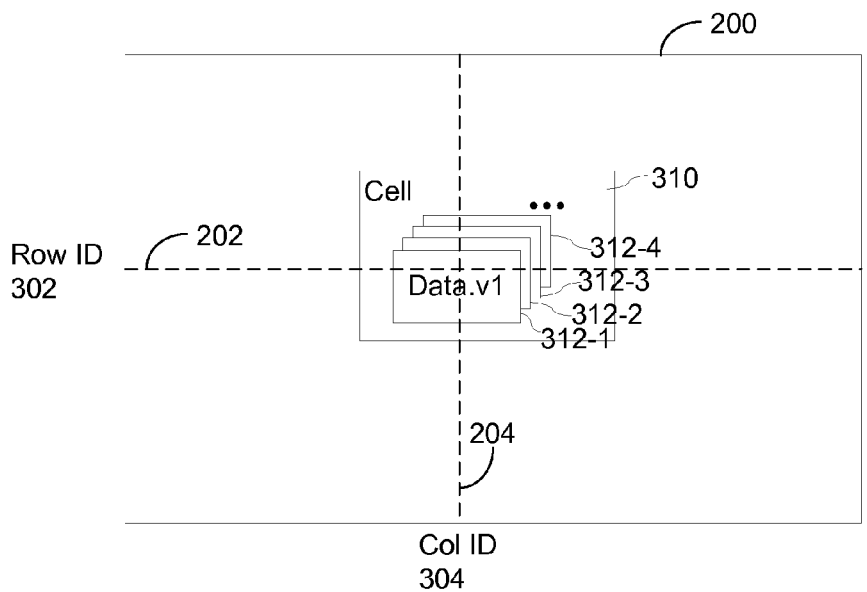
FIG. 3 is a conceptual block diagram of a cell in a table data structure in accordance with some embodiments.

As shown in FIG. 3 in accordance with some embodiments, a cell 310 in the table 200 represents the junction of a specified row 202, as identified by a row identifier 302, and column 204, as identified by a column identifier 304. Furthermore, multiple versions 312 of a data item can be stored in a single cell 310. Each version of the data item is assigned either a version number or timestamp.

Figure 4A:
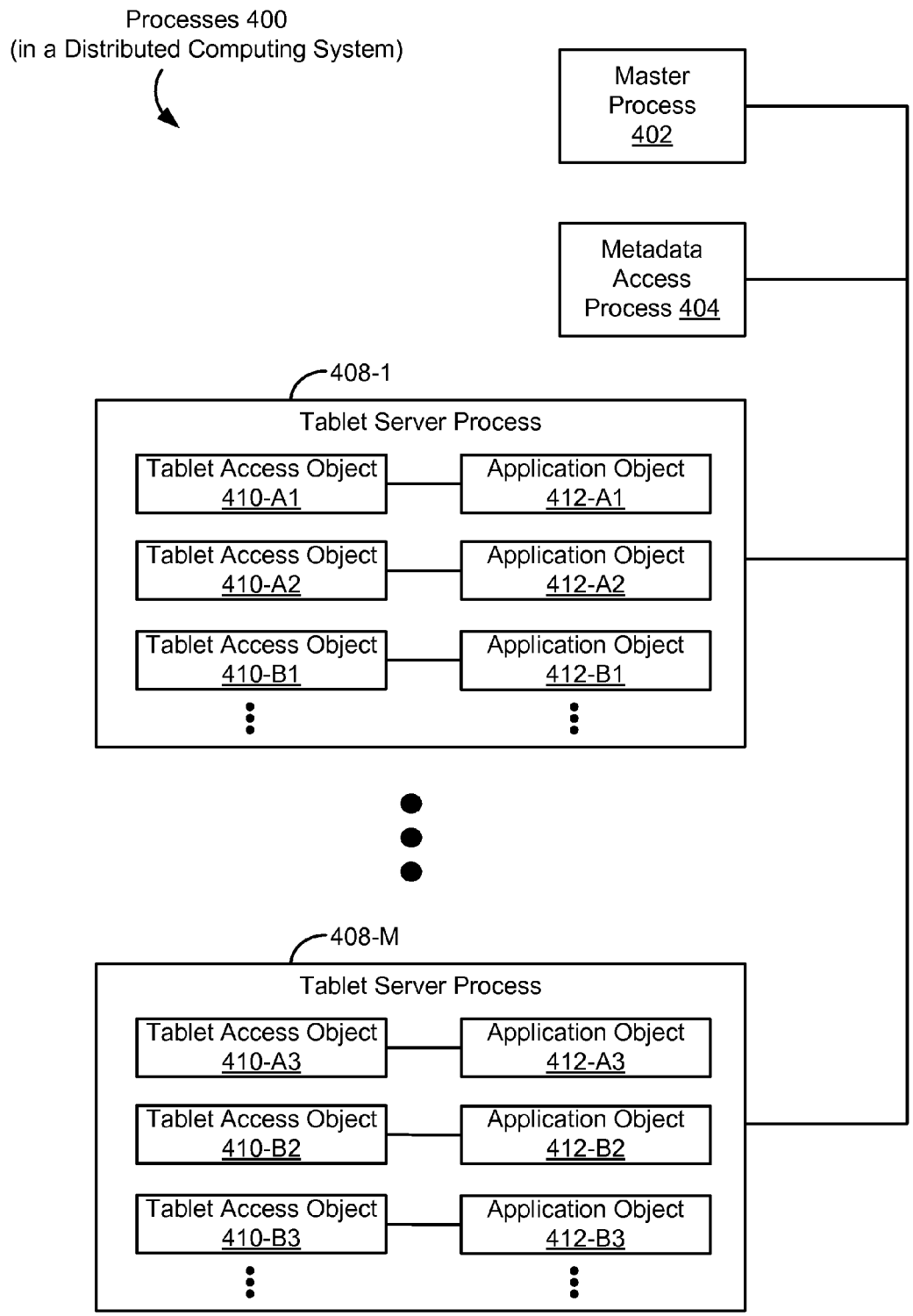
FIGS. 4A and 4B are block diagrams illustrating processes executed in a distributed computing system in accordance with some embodiments.

FIG. 4A is a block diagram illustrating processes 400 executed in a distributed computing system (e.g., the system 100, FIG. 1) that provides access to at least two tables (e.g., two tables 200, FIG. 2) in accordance with some embodiments. In this discussion, a first table is referred to as "table A" and a second table is referred to as "table B." The processes 400 include a master process 402, a metadata access process 404, and multiple tablet server processes 408-1 through 408-M, where M is an integer indicating the number of tablet server processes being executed.

Each tablet server process 408 includes one or more tablet access objects 410, each of which is associated with and distinct from an application object 412. Each tablet access object 410 and associated application object 412 are associated with and distinct from a respective tablet for one of the tables. For example, tablet access object 410-A1 and associated application object 412-A1 are associated with a first tablet in table A, tablet access object 410-A2 and associated application object 412-A2 are associated with a second tablet in table A, and tablet access object 410-A3 and associated application object 412-A3 are associated with a third tablet in table A. Similarly, tablet access object 410-B1 and associated application object 412-B1 are associated with a first tablet in table B, tablet access object 410-B2 and associated application object 412-B2 are associated with a second tablet in table B, and tablet access object 410-B3 and associated application object 412-B3 are associated with a third tablet in table B. FIG. 4A illustrates that tablet access objects 410 and associated application objects 412 for a respective table are split among multiple tablet server processes 408: for example, for table A, objects 410-A1, 412-A1, 410-A2, and 412-A2 are assigned to tablet server process 408-1, while objects 410-A3 and 412-A3 are assigned to tablet server process 408-M. FIG. 4A also illustrates that tablet access objects 410 and associated application objects 412 for multiple tables may be assigned to the same tablet server process 408: for example, processes 408-1 and 408-M each include tablet access objects 410 and associated application objects 412 for tablets in both table A and table B.

Each tablet access object 410 controls access to its associated tablet by enabling data access operations, such as table read operations or table write operations, for its associated tablet. In some embodiments, data access operations are performed in response to a request directed to the associated tablet. In some embodiments, requests originate from a client (e.g., a client system 102, FIG. 1).

Each application object 412 for a respective table (e.g., table A or table B) corresponds to a distinct instantiation of an application associated with the respective table. For example, application objects 412-A1, 412-A2, and 412-A3 are distinct instantiations of an application associated with table A, while application objects 412-B1, 412-B2, and 412-B3 are distinct instantiations of an application associated with table B. In response to a request (e.g., a request from a client) directed to a tablet, the application object 412 associated with the tablet enables performance of a computational operation in addition to the data access operation performed by the associated tablet access object 410. In some embodiments, requests (e.g., remote procedure calls) are directed to the application object 412, which in turn provides instructions to the associated tablet access object 410 to perform one or more data access operations in accordance with the request. Code associated with an application object 412 may be whatever code is necessary to implement the corresponding application, and thus is arbitrary, whereas code associated with a tablet access object 410 corresponds to data access operations. Associating an application object 412 with a tablet access object 410 thus attaches an application-specific method to the corresponding tablet 208, and thereby co-locates application-specific computational processing with access to data to be processed.

In one example, each application object 412A corresponds to a distinct instantiation of a search application for table A, such as an application that provides regular expression searches for table A. A respective application object 412A, upon receiving a request to search for a specified pattern in its associated tablet, instructs its associated tablet access object 410A to perform data access operations to search for the specified pattern. The application object 412A may perform additional computational operations, such as filtering search results, aggregating search results, or verifying permission to perform the search. The application object 412A also may cache tablet contents to facilitate searching.

The application objects 412 in FIG. 4A are internal to tablet server processes 408. For example, application objects 412 and their associated methods may be hard-coded into the binary code for a respective tablet server process 408. In some embodiments, however, application objects are executed separately from tablet server processes.

Figure 4B:
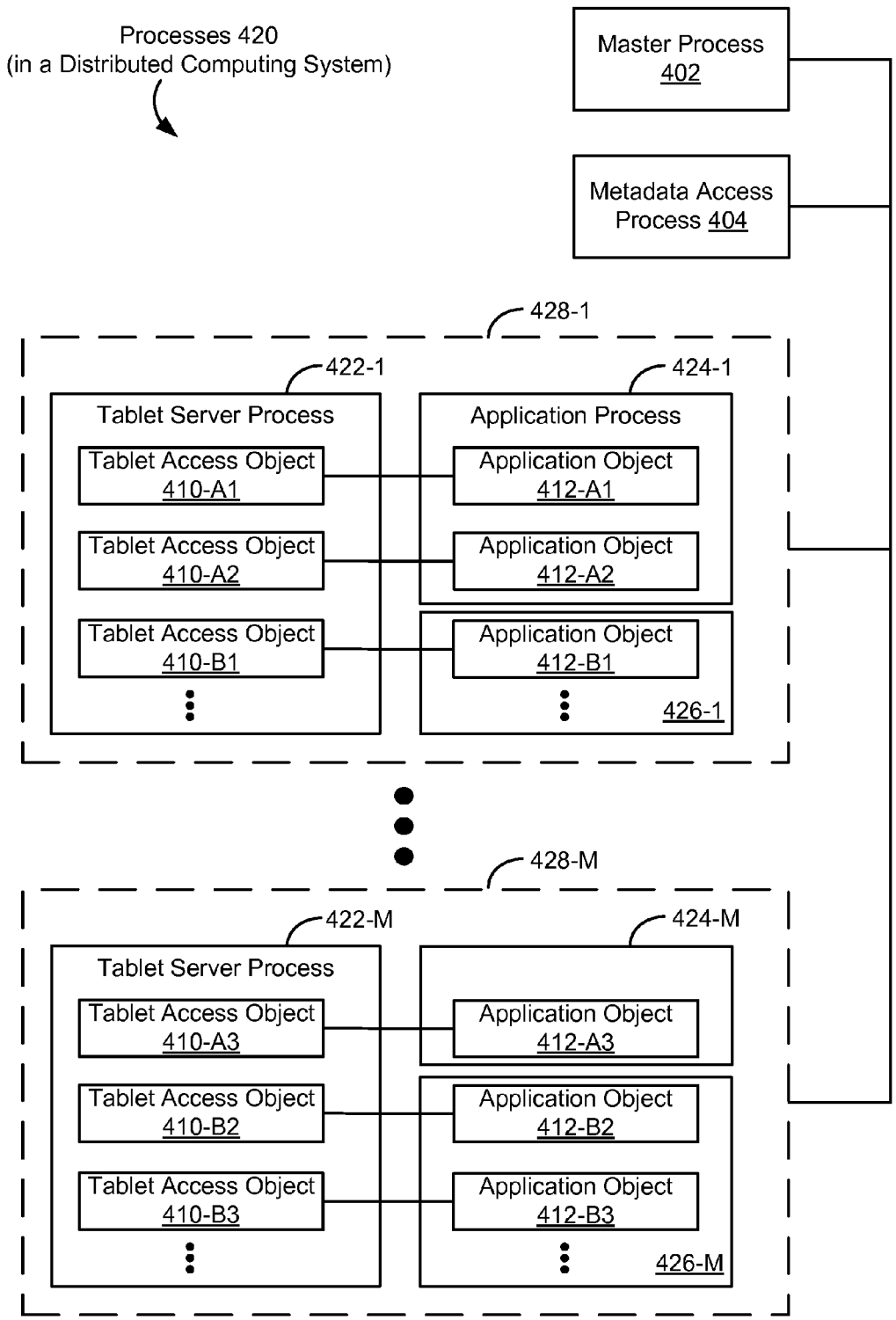

In FIG. 4B, the processes 420 executed in a distributed computing system (e.g., the system 100, FIG. 1) include application objects 412 that are external to tablet server processes 422-1 through 422-M that include the tablet access objects 410 with which the application objects 412 are associated. The application objects 412 are included in application processes executed by the same server 428 (e.g., a data server 106, FIG. 1) that hosts the associated tablet access objects 410. For example, the server 428-1 executes a tablet server process 422-1 that includes tablet access objects 410-A1 and 410-A2 for table A and 410-B1 for table B. The server 428-1 also executes an application process 424-1 that includes application objects 412-A1 and 412-A2, which are associated with tablet access objects 410-A1 and 410-A2 for table A. In addition, the server 428-1 executes an application process 426-1 that includes application object 412-B1, which is associated with tablet access object 410-B1 for table B, and possibly other application objects for table B.

While FIG. 4B shows application objects 412 as being located on the same servers 428 as their associated tablet access objects 410, in some embodiments application objects 412 are located on separate servers from their associated tablet access objects 410. For example, a respective application object 412 may be located on a server on the same rack as the server storing the associated tablet access object 410, or on a server that is near enough to the server storing the associated tablet access object 410 such that responses from the associated tablet access object 410 to commands from the respective application object 412 satisfy (e.g., the responses are received within) a maximum allowable latency.

In some embodiments, all application objects 412 hosted on a particular server 428 and associated with a particular table are included in a single process: for example, application objects 412-A1 and 412-A2 are included in a process 424-1, and application objects 412-B2 and 412-B3 are included in a process 426-M. Alternatively, but less efficiently, each application object 412 could be included in a distinct process, such that a distinct application process is associated with each tablet.

Figure 4C:
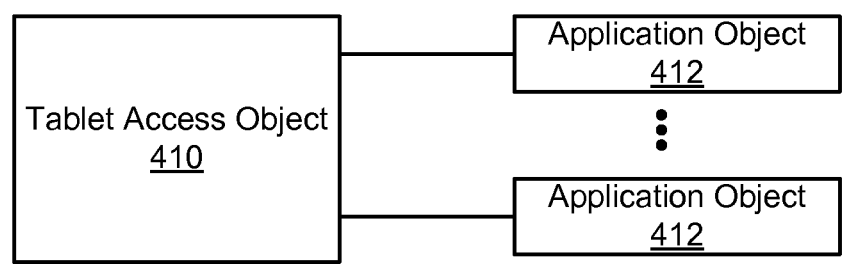
FIG. 4C is a block diagram illustrating a tablet access object having multiple associated application objects in accordance with some embodiments.

In some embodiments, a tablet access object 410 has multiple associated application objects 412, as illustrated in FIG. 4C. For example, multiple applications may access data in a tablet associated with the tablet access object 410. Each application object 412 for a particular tablet thus may be a distinct instantiation of one of multiple applications.

A master process 402 (FIGS. 4A-4B) monitors the load on servers and on tablet access objects 410 and their associated application objects 412. The master process redistributes tablet access objects 410 and/or associated application objects 412 among various servers in accordance with one or more load-balancing criteria as applied to a server, a tablet access object 410, and/or an application object 412. Examples of load-balancing criteria include criteria based on CPU usage (e.g., whether CPU usage exceeds a specified percentage), memory usage (e.g., whether memory usage exceeds a specified amount), and/or latency (e.g., whether the latency for responses to client requests or to requests from an application object 412 to its associated tablet access object 410 exceeds a specified amount of time). In some embodiments, redistributing a tablet access object 410 and/or associated application object 412 includes unloading the object(s) 410 and/or 412 from a first server and loading the objects 410 and/or 412 onto a second server. Redistribution of tablet access objects 410 and associated application objects 412 does not affect the storage location of associated tablets.

The master process 402 also may split or merge tablets. For example, if a tablet has a size or load that exceeds a threshold, the master process may split the tablet into two or more tablets that correspond to distinct non-overlapping portions (e.g., non-overlapping row ranges) of the original tablet. When a tablet is split, its associated tablet access object 410 and application object 412 also are split into two or more tablet access objects 410 and two or more application objects 412, such that each pair of objects 410 and 412 is associated with one of the distinct non-overlapping portions of the original tablet. Similarly, if two or more tablets have sizes or loads below a threshold, the master process may merge the tablets into a single tablet. When tablets are merged, their associated tablet access objects 410 and application objects 412 are merged into a single pair of objects 410 and 412.

A metadata access process 404 provides access to metadata regarding tables and their constituent tablets. For example, the metadata access process 404 provides access to metadata that identifies tablet boundaries within tables 200 (FIG. 2) and maps tablets to the server locations of their associated tablet access objects 410 and application objects 412. Thus, in response to a client request specifying a row, row range, or set of row ranges in a table, the metadata access process 404 identifies the tablet or tablets that correspond to the request and the server location(s) of the tablet access objects 410 and application objects 412 associated with the identified tablet(s). The request is then directed to the associated application objects 412 and tablet access objects 410. Other examples of metadata that may be accessed through the process 404 are described below with regard to FIGS. 5A-5D.

Figure 4D:
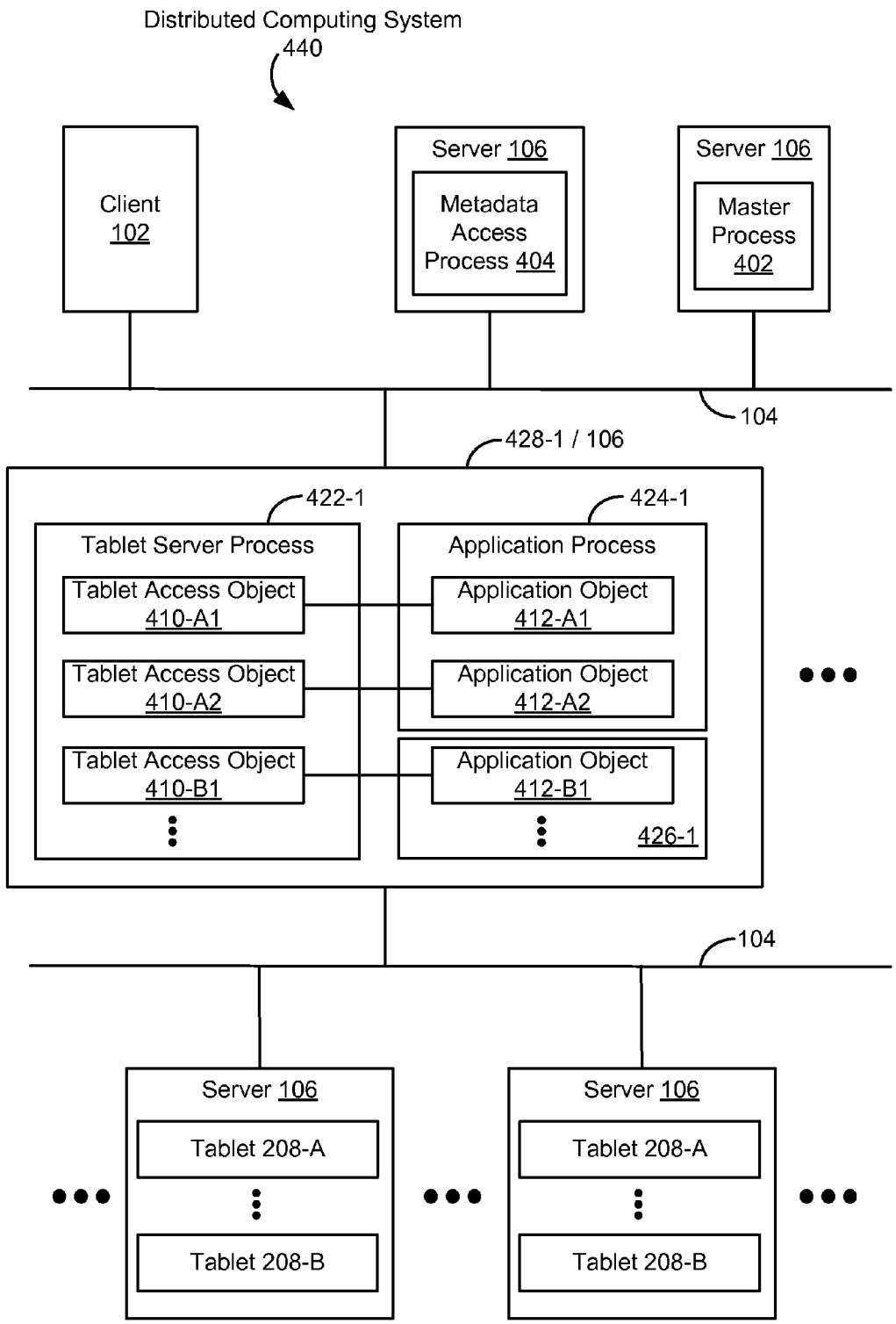
FIG. 4D is a block diagram illustrating a distributed computing system in accordance with some embodiments.

FIG. 4D is a block diagram illustrating a distributed computing system 440 for executing the processes 400 (FIG. 4A) or 420 (FIG. 4B) in accordance with some embodiments. The distributed computing system 440 is an example of a system 100 (FIG. 1). While FIG. 4D illustrates application objects 412 that are external to tablet server processes 422, a similar system may be implemented with application objects 412 that are internal to tablet server processes (e.g., as illustrated in FIG. 4A).

In the system 440, a network 104 connects a client system 102 with multiple servers 106. The servers 106 execute the master process 402, metadata access process 404, tablet server processes 422, and application processes 424 and 426. (A server 106 executing the master process 402 corresponds to the master server 108, FIG. 1.) Also implemented with the servers 106 is a file system for storing tablets for multiple tables (e.g., tablets 208-A for table A and tablets 208-B for table B) and for storing metadata. The servers 106 used for the file system may overlap with the servers 106 used to execute the processes 402, 404, 422, 424, and/or 426.

In some embodiments, a request from the client 102 specifies (1) a row, a range or rows, or a set of row ranges in a particular table, and (2) argument data. Using the metadata access process 404, the system 440 identifies the one or more tablets corresponding to the row, range of rows, or set of row ranges in the client request. Parallel requests (e.g., remote procedure calls) are sent to each server 106 hosting application objects 412 associated with the identified tablets. The servers 106 provide the requests to the associated application objects 412, which direct the associated tablet access objects 410 to perform data access operations as specified by the client request. The associated application objects 412 also perform one or more computational operations in accordance with the client request and the argument data specified in the request. Results are returned from the servers 106 to the client 102.

Redistribution, tablet splitting, and tablet merging operations performed by the master process 402 are performed in parallel with and independently of processing of client requests. Moving a tablet access object 410 and/or application object 412 from a first server 106 to a second server 106, or splitting or merging tablets, can cause a request to a particular application object 412 to fail. In some embodiments, an application object 412 supplies a lock token to an operation issuing a request to the application object 412. The lock token will produce an error if the application object 412 does not respond to the request in a specified amount of time, thus alerting the operation that the request failed.

Attention is now directed to data structures for storing metadata associated with tables 200 and tablets 208 (FIG. 2).

FIG. 5A is a block diagram of a data structure for storing metadata 500 associated with a set of tables in accordance with some embodiments. In some embodiments the table metadata 500 includes a record 502 for each distinct table 200 (FIG. 2) stored in a file system in a distributed computing system 100 (FIG. 1). Each table metadata record 502 may include a table identifier 504, a name of the table 506, and optionally may include other per table parameters 508 (e.g., the identifier of an administrator or creator of the table).

FIG. 5B is a block diagram of a data structure for storing metadata 510 associated with tablets in a set of tables in accordance with some embodiments. In some embodiments, the tablet metadata 510 includes a record 512 for each distinct tablet 208 (FIG. 2) stored in a file system in a distributed computing system 100 (FIG. 1). Each tablet metadata record 512 includes a table identifier 514, the row identifier of the last row of the tablet 516, an identifier or location 518 of the server that hosts the tablet access object 410 and application object 412 associated with the tablet and thus controls access to the tablet, and a set of information 519 representing the state of the tablet. In some embodiments, if a tablet access object 410 is stored on a separate server from its associated application object 412, the metadata 510 includes separate identifiers 518 for the objects 410 and 412. Alternatively, the metadata 510 includes an identifier 518 for the application object 412 and the application object 412 stores a pointer to its associated tablet access object 410. In some embodiments, tablet state information 519 includes a list of files that store the content of the tablet. In some embodiments, the tablet metadata 510 includes one or more load metrics 520 (e.g., 520-1 through 520-3). Examples of load metrics 520 include CPU usage (e.g., CPU usage for the tablet access object 410 and application object 412 associated with the tablet), memory usage, and/or latency for responses to requests directed to the tablet. The tablet metadata records 512 may optionally include additional fields. The combination of the table identifier 514 and last row identifier 516 provides a key to the tablet metadata table 510, because the tablet metadata records 512 are ordered within the tablet metadata table 510 in accordance with the table identifier concatenated with the last row name or identifier. In some other embodiments, each tablet metadata record may include the table identifier and the name of the first row of the next tablet in the table as the key of tablet metadata table. If a tablet is the last tablet of a table, a predefined "infinity" designation may be used in place of the name of the (non-existent) first row in the next tablet in the table.

The range of rows included in any particular tablet is specified by the last row identifiers 516 in two tablet metadata records 512: the record 512 of the particular tablet and the immediately preceding record 512 in the tablet metadata table. If the immediately preceding record 512 in the tablet metadata table has a different table identifier, then the current tablet is the first tablet of its table.

To locate the tablet that stores a specified row of a table (e.g., a row specified in a client request), the tablet metadata 510 is searched or scanned until the first tablet metadata record 512 is found that (A) has the same table identifier 514 as the tablet and (B) has a last row 516 that is equal to (i.e., has the same value or sort value) or greater than (i.e., has a higher value, or sort value) the specified row. This record 512 identifies the tablet that stores the specified row, and the server location 518 specified by this record 512 identifies the server that hosts the application object 412 (and in some embodiments, the tablet access object 410) associated with the tablet and thus controls access to the tablet. In the embodiments where the tablet key is the table identifier and the name of the first row of the next tablet of the table, the record identifying the tablet that stores a specified row of a table is located by scanning the tablet metadata until the first tablet metadata record is found that (A) has the same table identifier as the tablet and (B) has a first row (of the next tablet) name that is greater (i.e., has a higher value, or sort value) than the specified row.

The master process 402 (FIGS. 4A, 4B, and 4D) monitors the load metrics 520 to determine whether to split or merge tablets and their associated tablet access objects 410 and application objects 412. In some embodiments, a decision to split a tablet is based on the combined load on the tablet's associated tablet access object 410 and application object 412.

In some embodiments the tablet metadata 510 is sufficiently voluminous that this metadata is itself stored in a table data structure divided into tablets. In some embodiments, the tablet metadata table 510 contains thousands, hundreds of thousands or millions of entries 512, each of which indicates the location of a distinct respective tablet in the distributed computing system 100 (FIG. 1).

FIG. 5C is a block diagram of a data structure for a tablet log 530 that records memory locations of tablets stored in a file system in accordance with some embodiments. The tablet log 530 includes a record 532 for each distinct tablet in the one or more tables stored in a file system in a distributed computing system 100. Each record 532 includes a tablet identifier 534 (e.g., a concatenation of a table identifier 514 and the last row 516 of the tablet) and at least one memory location 536 where the tablet is stored. In some embodiments, tablets are stored redundantly, with corresponding multiple memory locations 536 listed in the tablet log 530. For example, a tablet may be redundantly stored on three separate servers 106 (FIGS. 1 and 4D), resulting in three different memory locations 536-1 through 536-3 being listed in the tablet log 530. The tablet log 530 may be queried by a tablet server process 408 (FIG. 4A) or 422 (FIG. 4B), in response to instructions from a tablet access object 410 to perform a data access operation on a tablet, to identify a memory location 536 for the tablet and thereby enable performance of the data access operation.

FIG. 5D is a block diagram of a data structure 540 that records loads on various servers 106 in a distributed computing system 100 (FIG. 1). The data structure 540 includes a record 542 for each server 106 in the system 100. Each record 542 includes a server identifier 544 and one or more load metrics 546 (e.g., 546-1 through 546-3) for a respective server 106. Examples of load metrics include CPU usage, memory usage, and latency for requests directed to the server 106. The master process 402 (FIGS. 4A, 4B, and 4D) monitors the load metrics 546 to determine whether to transfer tablet access objects 410 and/or associated application objects 412 to or from respective servers 106 (e.g., whether to unload or load a tablet access object 410 and/or associated application object 412 from or to a respective server 106). In some embodiments, if a tablet access object 410 and its associated application object 412 are located on separate servers, a decision to move an object 410 or 412 is based on a load on the server hosting the object 410 or 412.

Figure 6:
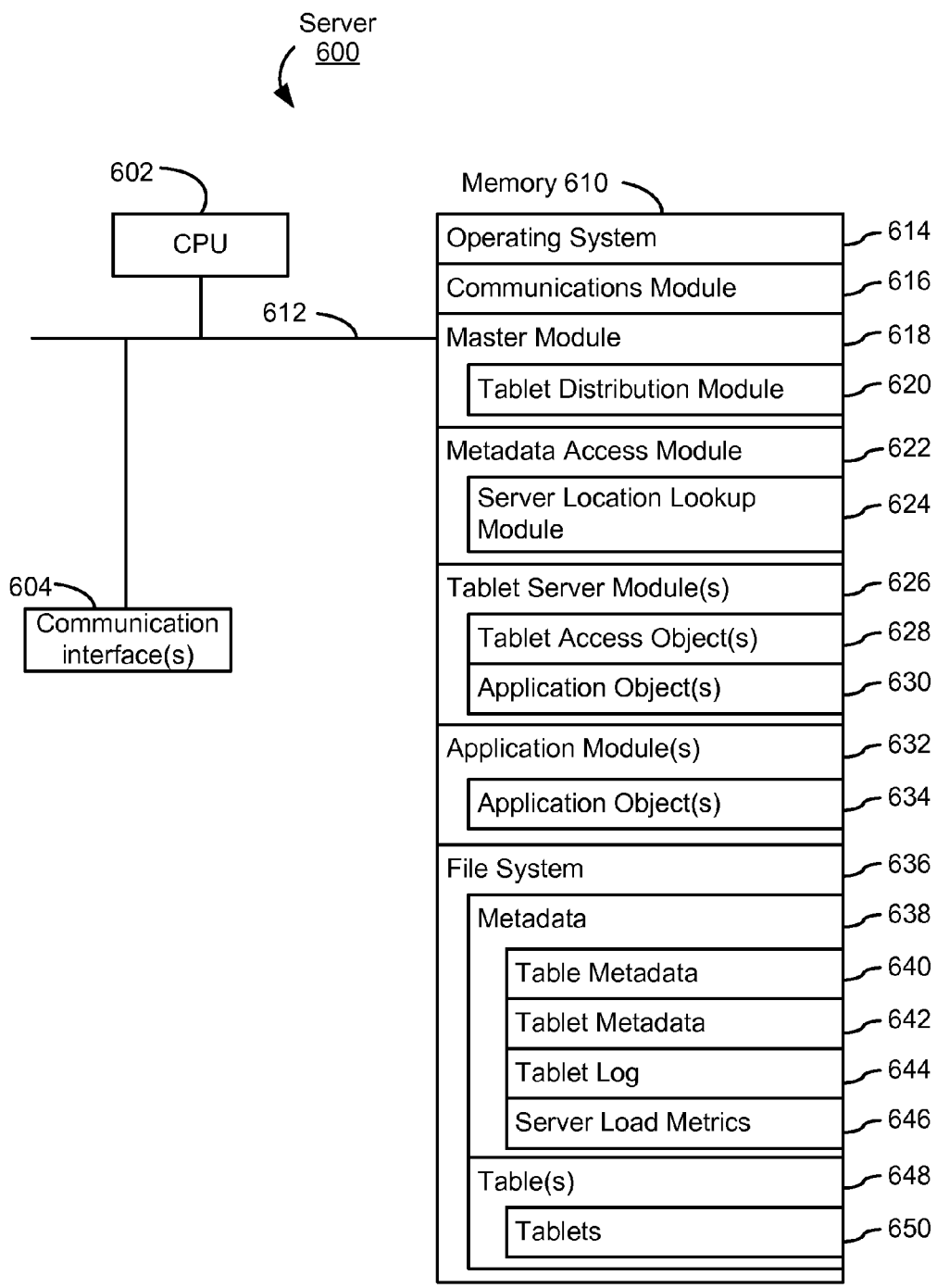
FIG. 6 is a block diagram illustrating a server in accordance with some embodiments.

FIG. 6 is a block diagram illustrating a server 600 in accordance with some embodiments. The server 600 is an example of an implementation of a server 106 (FIG. 1) and typically includes one or more processing units (CPUs) 602, one or more network or other communications interfaces 604, memory 610, and one or more communication buses 612 for interconnecting these components. Memory 610 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 610 may optionally include one or more storage devices remotely located from the CPU(s) 602. Memory 610, or alternately the non-volatile memory device(s) within memory 610, comprises a computer readable storage medium. In some embodiments, the memory 610 stores the following programs, modules, and data structures, or a subset thereof:

- an operating system 614 that includes procedures for handling various basic system services and for performing hardware dependent tasks;
- a network communication module 616 that is used for connecting the server 600 to other computers via the one or more communication network interfaces 604 and one or more communication networks, such as a local area network, the Internet, other wide area networks, metropolitan area networks, and so on;
- a master module 618 for monitoring loads on servers and on tablet access objects and their associated application objects, and for performing load-balancing operations such as splitting or merging tablets and moving tablet access objects and/or their associated application objects from one server to another server;
- a metadata access module 622 for accessing metadata regarding tables and their constituent tablets;
- a tablet server module 626 for controlling access to tablets and, in some embodiments, for performing additional computational operations in response to client requests;
- one or more application modules 632 corresponding to applications associated with respective tables, for performing computational operations in response to client requests; and
- a file system 636 for storing tables or constituent portions of tables (e.g., tablets);

In some embodiments, the master module 618 includes a tablet distribution module 620 for distributing tablets among servers in a distributed computing system (e.g., by moving, splitting, and merging tablets).

In some embodiments, the metadata access module includes a server location lookup module 624 for identifying servers that control access to tablets corresponding to rows, row ranges, or sets of row ranges specified in client requests.

In some embodiments, the tablet server module 626 includes tablet access objects 628 and application objects 630. Alternatively, in some embodiments application objects are included in one or more application modules 632.

In some embodiments, the file system 636 includes metadata 638, which may include table metadata 640, tablet metadata 642, a tablet log 644, and server load metrics 646. The file system also includes one or more tables 648 and their constituent tablets 650.

Each of the above identified elements of the server 600 may be stored in one or more of the previously mentioned memory devices in memory 610, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 610 may store a subset of the modules and data structures identified above. Furthermore, memory 610 may store additional modules and data structures not described above.

Although FIG. 6 shows a server 600, FIG. 6 is intended more as a functional description of the various features which may be present in a server, or a set of such servers, than as a structural schematic of the embodiments described herein. In practice, and as recognized by those of ordinary skill in the art, items shown separately could be combined and some items could be separated. For example, some items shown separately in FIG. 6 could be implemented on single servers and single items could be implemented by one or more servers.

FIGS. 7A-7D are flow diagrams illustrating a method 700 of accessing data in accordance with some embodiments. The method 700 is performed in a distributed computing system (e.g., a system 100, FIG. 1, such as a system 440, FIG. 4D) that includes multiple servers (e.g., multiple servers 106, FIG. 1, such as servers 600, FIG. 6). In the method 700, a table data structure (e.g., a table 200, FIG. 2) is stored (702) in a file system. The table data structure includes a plurality of tablets that correspond to distinct non-overlapping table portions. In some embodiments, the tablets correspond (704) to distinct ranges of rows, as illustrated for tablets 208-1 through 208-L (FIG. 2).

A plurality of tablet access objects (e.g., objects 410, FIG. 4A or 4B) and a plurality of application objects (e.g., objects 412, FIG. 4A or 4B) are stored (706) in a plurality of servers (e.g., servers 106, FIG. 1). A distinct application object is associated with each tablet access object. Each application object and associated tablet access object are associated with and distinct from a respective tablet of the table data structure. Each application object corresponds to a distinct instantiation of an application associated with the table data structure.

In some embodiments, the file system is implemented in a cluster of servers that includes the plurality of servers.

In some embodiments, each application object is stored on the same server as its associated tablet access object. Alternatively, a respective application object may be stored on a separate server from its associated tablet access object. For example, the respective application object may be stored on a server on the same rack as the server storing the associated tablet access object, or on a server that is near enough to the server storing the associated tablet access object such that responses from the associated tablet access object to commands from the respective application object satisfy (e.g., the responses are received within) a maximum allowable latency.

In some embodiments, one or more tablets are stored on a different server than their associated tablet access objects and application objects.

The tablet access objects and associated application objects are redistributed (708) among the plurality of servers in accordance with a first load-balancing criterion. For example, the master process 402 (FIGS. 4A-4B) directs redistribution of the objects 410 and 412 among servers 106 in accordance with one or more load-balancing criteria. In some embodiments, redistributing the tablet access objects and associated application objects among the plurality of servers does not modify storage locations of tablets associated with the redistributed objects.

A first request directed to a respective tablet is received (710) from a client (e.g., a client 102, FIG. 1). In some embodiments, the client is distinct from the plurality of servers. Alternatively, the client may be a particular server in the plurality of servers.

In response to the first request, the tablet access object associated with the respective tablet is used (712) to perform a data access operation on the respective tablet and the application object associated with the respective tablet is used to perform an additional computational operation to produce a result to be returned to the client.

In some embodiments, the data access operation is a search operation and the additional computational operation includes filtering search results, aggregating search results, or verifying permission to perform the search. In some embodiments, the application object associated with the respective tablet caches search results.

In some embodiments, a determination is made (714, FIG. 7B) that a load on a first server in the plurality of servers exceeds a second load-balancing criterion. In response, a tablet access object and/or associated application object are unloaded (716) from the first server and loaded (718) onto a second server in the plurality of servers. For example, the master process 402 (FIGS. 4A-4B) may determine that the load on the first server exceeds the second load-balancing criterion, and in response may direct the first server to unload the object(s) and the second server to load the object(s). If a tablet access object and its associated application object are stored on the first server, both objects may be unloaded and loaded onto another server in response to the determination of operation 714. If only the tablet access object or the associated application object is stored on the first server, that particular object may be unloaded and loaded onto another server in response to the determination of operation 714.

In some embodiments, a tablet is divided (722) into first and second new tablets that correspond to distinct non-overlapping portions of the particular tablet. A first application object and first tablet access object are associated (724) with the first new tablet and a second application object and second tablet access object are associated with the second new tablet. The first and second application objects correspond to distinct instantiations of the application associated with the table data structure. In some embodiments, operations 722 and 724 are performed in response to a determination that the tablet has a size exceeding a first size criterion or a determination that a load on the tablet exceeds a first load criterion. For example, the master process 402 (FIGS. 4A-4B) may direct that the tablet be divided in response to determining that the tablet size or load exceeds the first size or load criterion. In some embodiments, operations 722 and 724 are performed in response to a determination that the number of requests for at least two distinct rows in the tablet exceed specified amounts; the tablet is then split such that each of the at least two distinct rows is in a distinct new tablet. In some embodiments, operations 722 and 724 are performed in response to a user command.

In some embodiments, a second request directed to a specified range of rows (or set of row ranges) in the table data structure is received (726, FIG. 7D) from the client. The specified range of rows (or set of row ranges) includes rows in multiple tablets. The multiple tablets are identified (728). One or more servers are identified (730) that store the application objects associated with the identified multiple tablets and one or more servers are identified that store the tablet access objects associated with the identified multiple tablets. In some embodiments, each application object associated with the identified multiple tablets is stored on the same server as its associated tablet access object. Alternatively, a respective application object associated with the identified multiple tablets may be stored on a separate server from its associated tablet access object. The request is directed (732) to the each of the identified one or more servers that store the application objects associated with the identified multiple tablets. In some embodiments, a remote procedure call (RPC) is issued (734) to the each of the identified one or more servers that store the application objects associated with the identified multiple tablets. Upon receipt of the request at the identified one or more servers that store the application objects associated with the identified multiple tablets, the application objects and tablet access objects associated with the identified multiple tablets are used (736) to execute the requests.

The method 700 co-locates application-specific processing with access to the data to be processed, thereby providing an efficient way to process data stored in a table in a distributed computing system, while also enabling load balancing. While the method 700 includes a number of operations that appear to occur in a specific order, it should be apparent that the method 700 can include more or fewer operations, which can be executed serially or in parallel (e.g., using parallel processors or a multi-threading environment), an order of two or more operations may be changed and/or two or more operations may be combined into a single operation. For example, operation 708 may be performed in parallel with operations 710-712.

Figure 7A:
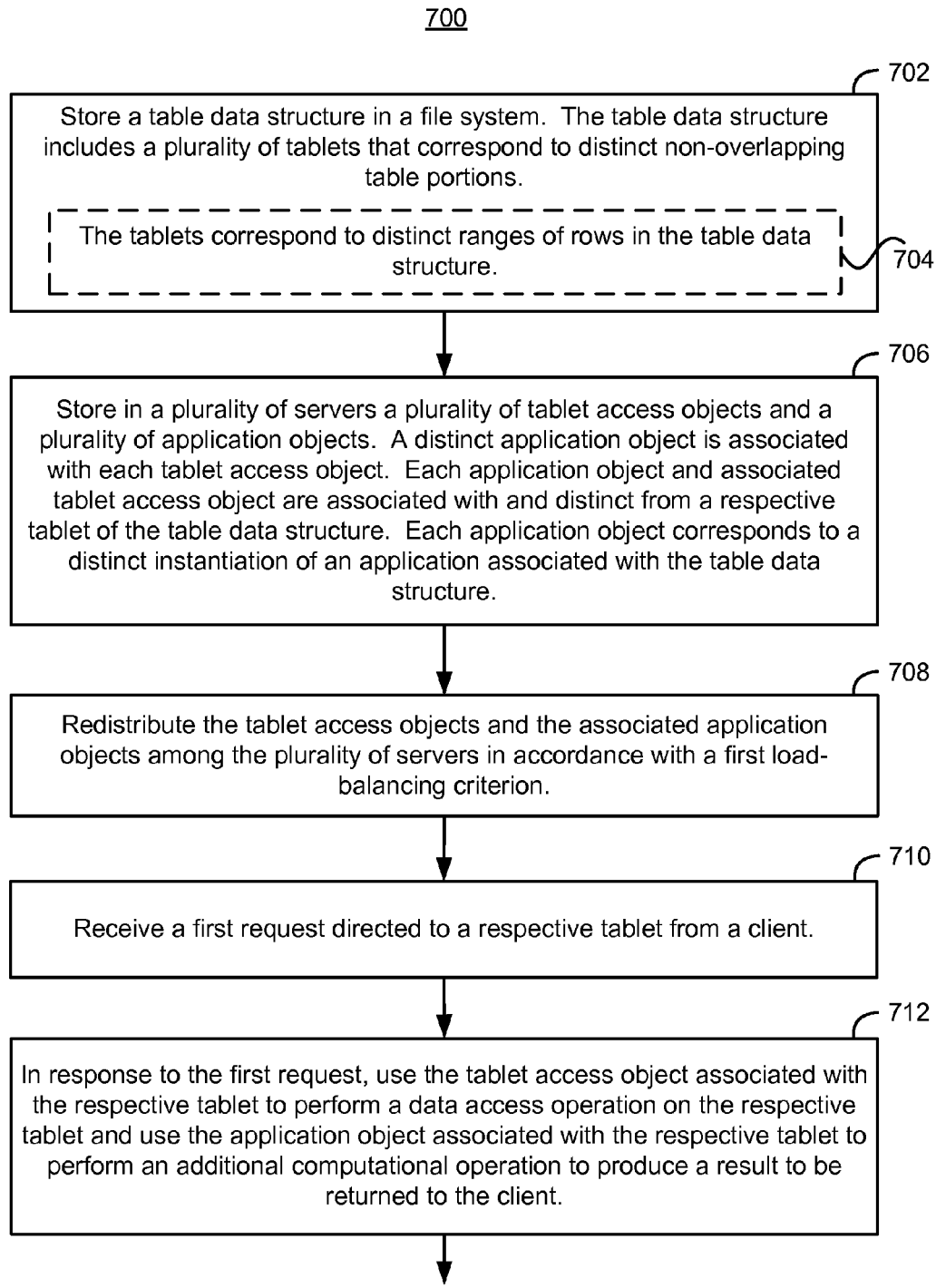
Figure 7B:
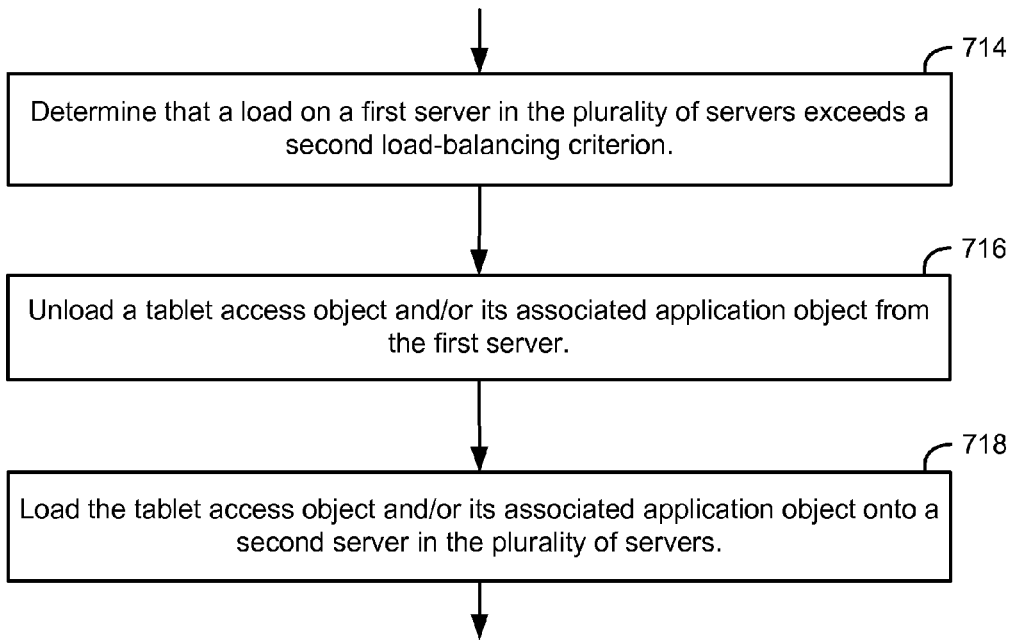
Figure 7C:
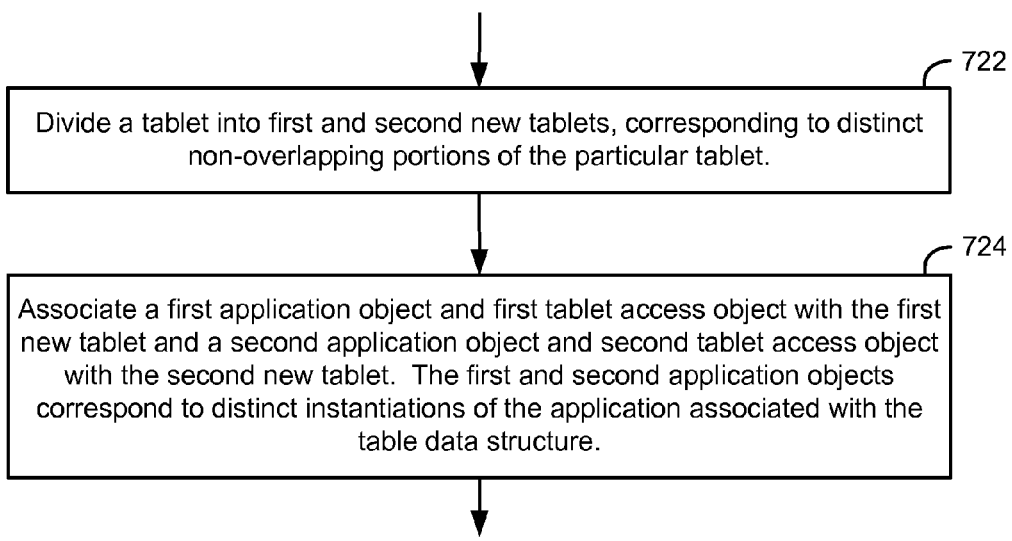
Figure 7D:
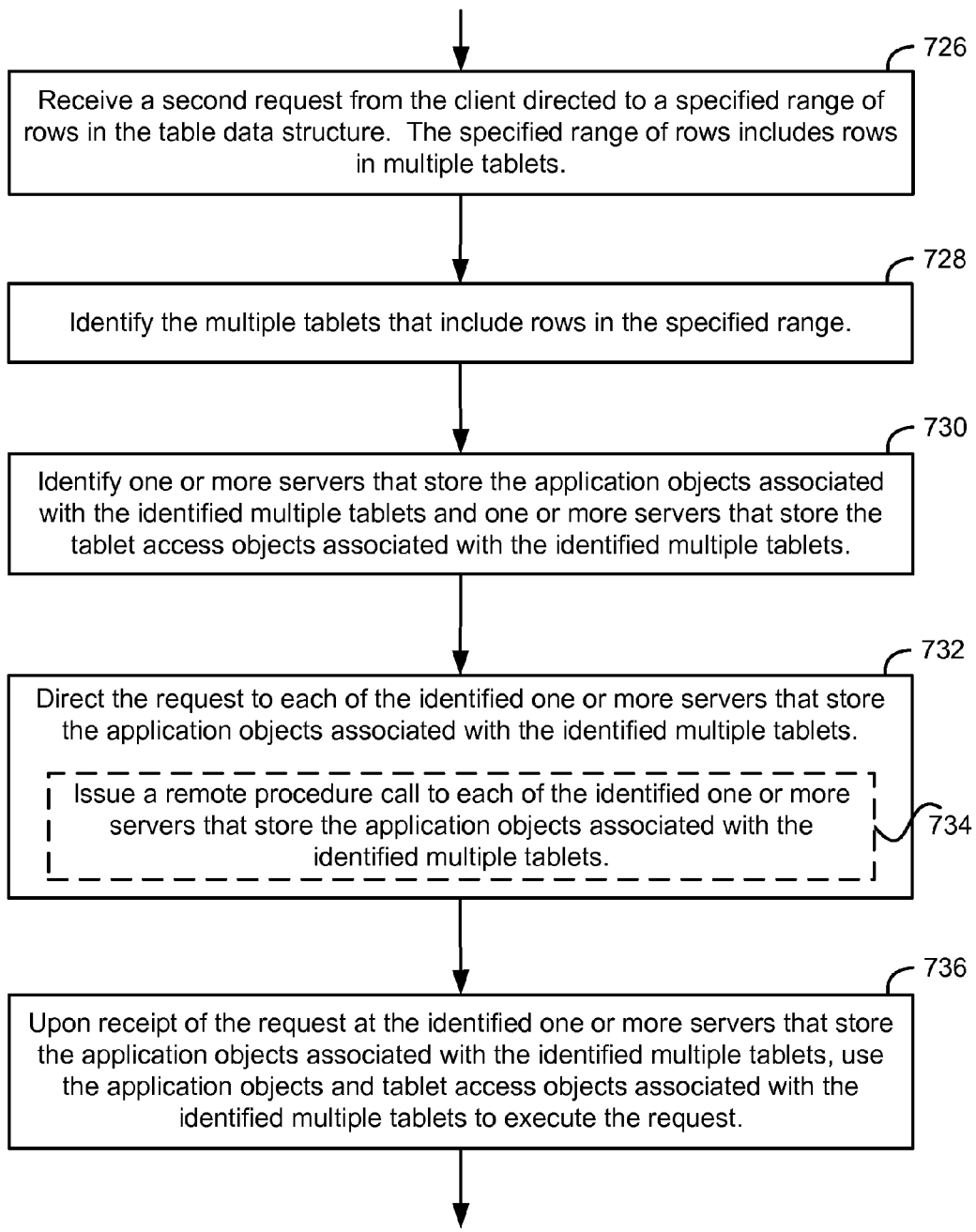
Figure 7F:
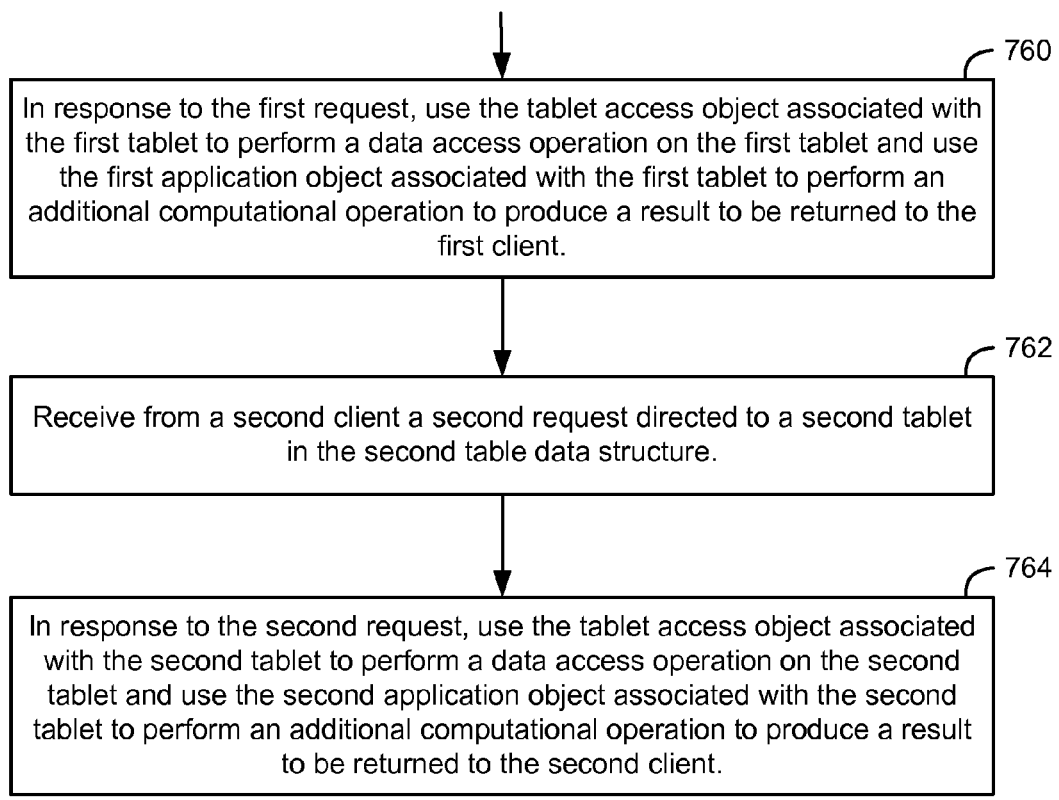

FIGS. 7E-7F are flow diagrams illustrating a method 750 of accessing data in multiple tables in accordance with some embodiments. The method 750 is performed in a distributed computing system (e.g., a system 100, FIG. 1, such as a system 440, FIG. 2) that includes multiple servers (e.g., multiple servers 106, FIG. 1, such as servers 600, FIG. 6). In the method 750, first and second table data structures (e.g., tables 200, FIG. 2) are stored (752, FIG. 7E) in a file system. In some embodiments, the file system is implemented in a cluster of servers that includes the plurality of servers. Each table data structure includes a plurality of tablets that correspond to distinct non-overlapping table portions. In some embodiments, the tablets correspond to distinct ranges of rows, as illustrated for tablets 208-1 through 208-L (FIG. 2). The first and second table data structures have distinct schemas.

A plurality of tablet access objects (e.g., objects 410, FIGS. 4A or 4B), a plurality of first application objects (e.g., objects 412-A, FIGS. 4A or 4B), and a plurality of second application objects (e.g., objects 412-B, FIGS. 4A or 4B) are stored (754) in a plurality of servers. Each tablet access object is associated with either a distinct first application object or a distinct second application object. Each first application object and associated tablet access object are associated with and distinct from a respective tablet of the first table data structure. Each first application object corresponds to a distinct instantiation of a first application associated with the first table data structure. Each second application object and associated tablet access object are associated with and distinct from a respective tablet of the second table data structure. Each second application object corresponds to a distinct instantiation of a second application associated with the second table data structure.

In some embodiments, each application object is stored on the same server as its associated tablet access object. In some embodiments, one or more tablets are stored on a different server than their associated tablet access objects and application objects.

The tablet access objects and associated first or second application objects are redistributed (756) among the plurality of servers in accordance with a first load-balancing criterion. For example, the master process 402 (FIGS. 4A-4B) directs redistribution of the objects 410 and 412 among servers 106 in accordance with one or more load-balancing criteria. In some embodiments, redistributing the tablet access objects and associated application objects among the plurality of servers does not modify storage locations of tablets associated with the redistributed objects.

A first request directed to a first tablet in the first table data structure is received (758) from a first client (e.g., a client 102, FIG. 1). In some embodiments the first client is distinct from the first plurality of servers. Alternatively the first client may be a particular server in the plurality of servers. In response to the first request, the tablet access object associated with the first tablet is used to perform (760, FIG. 7F) a data access operation on the first tablet and the first application object associated with the first tablet is used to perform an additional computational operation to produce a result to be returned to the first client.

A second request directed to a second tablet in the second table data structure is received (762) from a second client (e.g., a client 102, FIG. 1). In some embodiments the second client is distinct from the first plurality of servers. Alternatively the second client may be a particular server in the plurality of servers. In response to the second request, the tablet access object associated with the second tablet is used to perform (764) a data access operation on the second tablet and the second application object associated with the second tablet is used to perform an additional computational operation to produce a result to be returned to the second client.

The method 750 co-locates, for multiple tables, application-specific processing with access to the data to be processed, thereby providing an efficient way to process data stored in a table in a distributed computing system, while also enabling load balancing. While the method 750 includes a number of operations that appear to occur in a specific order, it should be apparent that the method 750 can include more or fewer operations, which can be executed serially or in parallel (e.g., using parallel processors or a multi-threading environment), an order of two or more operations may be changed and/or two or more operations may be combined into a single operation. For example, operation 756 may be performed in parallel with operations 758-760 and also with operations 762-764.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of accessing data, comprising:

storing a table data structure in a file system, the table data structure including a plurality of tablets that correspond to distinct non-overlapping table portions;

storing software modules in a plurality of servers, the software modules including a plurality of tablet access objects and a plurality of application objects, wherein a distinct application object is associated with each tablet access object, and each application object and the associated tablet access object are associated with and distinct from a respective tablet of the table data structure, wherein each application object corresponds to a distinct instantiation of an application associated with the table data structure;

after the storing, redistributing the tablet access objects and the associated application objects among the plurality of servers in accordance with a first load-balancing criterion, wherein, after the redistributing, at least one tablet of the plurality of tablets is stored on a different server than its associated tablet access object and application object;

after the redistributing, receiving a first request directed to a respective tablet from a client; and in response to the first request, using the tablet access object associated with the respective tablet to perform a data access operation on the respective tablet, and using the application object associated with the respective tablet to perform an additional computational operation to produce a result to be returned to the client, wherein the tablet access object associated with the respective tablet and used to perform the data access operation on the respective tablet is stored on a different server than the respective tablet.

2. The method of claim 1, wherein redistributing the tablet access objects and the associated application objects among the plurality of servers does not modify storage locations of tablets.

3. The method of claim 1, wherein the tablets correspond to distinct ranges of rows in the first table data structure.

4. The method of claim 1, wherein the tablets correspond to distinct ranges of rows in the table data structure, the method further comprising:

receiving a second request from the client directed to a specified range of rows in the table data structure, wherein the specified range of rows includes rows in multiple tablets;

identifying the multiple tablets that include rows in the specified range;

identifying one or more servers that store the application objects associated with the identified multiple tablets and one or more servers that store the tablet access objects associated with the identified multiple tablets;

directing the request to each of the identified one or more servers that store the application objects associated with the identified multiple tablets; and upon receipt of the request at the identified one or more servers that store the application objects associated with the identified multiple tablets, using the application objects and tablet access objects associated with the identified multiple tablets to execute the request.

5. The method of claim 4, wherein directing the request to each of the identified one or more servers that store the application objects associated with the identified multiple tablets comprises issuing a remote procedure call to each of the identified one or more servers that store the application objects associated with the identified multiple tablets.

6. The method of claim 1, wherein each application object is stored on the same server as its associated tablet access object.

7. The method of claim 6, wherein the tablets correspond to distinct ranges of rows in the table data structure, the method further comprising:

receiving a second request from the client directed to a specified range of rows in the table data structure, wherein the specified range of rows includes rows in multiple tablets;

identifying the multiple tablets that include rows in the specified range;

identifying one or more servers that store the application objects and tablet access objects associated with the identified multiple tablets;

directing the request to each of the identified one or more servers; and upon receipt of the request at the identified one or more servers, using the application objects and tablet access objects associated with the identified multiple tablets to execute the request.

8. The method of claim 7, wherein directing the request to each of the identified one or more servers comprises issuing a remote procedure call to each of the identified one or more servers.

9. The method of claim 1, wherein a respective application object includes server location information for its associated tablet access object.

10. The method of claim 1, wherein the data access operation is a search operation and the additional computational operation is selected from the group consisting of filtering search results, aggregating search results, and verifying permission.

11. The method of claim 10, wherein the application object associated with the respective tablet caches search results.

12. The method of claim 1, wherein the file system is implemented in a cluster of servers that includes the plurality of servers.

13. The method of claim 1, further comprising:
determining that a load on a first server in the plurality of servers exceeds a second load-balancing criterion;
unloading a tablet access object and associated application object from the first server; and
loading the tablet access object and associated application object onto a second server in the plurality of servers.

14. The method of claim 1, further comprising:
determining that a load on a first server in the plurality of servers exceeds a second load-balancing criterion;
unloading a tablet access object from the first server; and
loading the tablet access object onto a second server in the plurality of servers.

15. The method of claim 1, further comprising:
determining that a load on a first server in the plurality of servers exceeds a second load-balancing criterion;
unloading an application object from the first server; and
loading the application object onto a second server in the plurality of servers.

16. The method of claim 1, further comprising:
dividing a particular tablet into first and second new tablets, corresponding to distinct non-overlapping portions of the particular tablet; and
associating a first application object and first tablet access object with the first new tablet and a second application object and second tablet access object with the second new tablet, wherein the first and second application objects correspond to distinct instantiations of the application associated with the table data structure.

17. The method of claim 16, wherein the dividing and associating are performed in response to a determination that the particular tablet has a size exceeding a first size criterion.

18. The method of claim 16, wherein the dividing and associating are performed in response to a determination that a load on the particular tablet exceeds a first load criterion.

19. The method of claim 18, wherein the determination includes a determination that numbers of requests for at least two distinct rows in the particular tablet exceed specified amounts.

20. The method of claim 16, wherein the dividing and associating are performed in response to a user command.

21. A method of accessing data, comprising:
storing first and second table data structures in a file system, each table data structure including a plurality of tablets that correspond to distinct non-overlapping table portions; wherein the first and second table data structures have distinct schemas;
storing software modules in a plurality of servers, the software modules including a plurality of tablet access objects, a plurality of first application objects, and a plurality of second application objects, wherein:

each tablet access object is associated with either a distinct first application object or a distinct second application object;
each first application object and associated tablet access object are associated with and distinct from a respective tablet of the first table data structure, wherein each first application object corresponds to a distinct instantiation of a first application associated with the first table data structure; and
each second application object and associated tablet access object are associated with and distinct from a respective tablet of the second table data structure, wherein each second application object corresponds to a distinct instantiation of a second application associated with the second table data structure, and at least one tablet of the plurality of tablets in the second table data structure is stored on a different server than its associated tablet access object and application object;
after the storing, redistributing the tablet access objects and associated first or second application objects among the plurality of servers in accordance with a first load-balancing criterion, wherein, after the redistributing, at least one tablet of the plurality of tablets in the first table data structure is stored on a different server than its associated tablet access object and application object;
after the redistributing, receiving from a first client a first request directed to a first tablet in the first table data structure;
in response to the first request, using the tablet access object associated with the first tablet to perform a data access operation on the first tablet, and using the first application object associated with the first tablet to perform an additional computational operation to produce a result to be returned to the first client, wherein the tablet access object associated with the first tablet and used to perform the data access operation on the first tablet is stored on a different server than the first tablet;
receiving from a second client a second request directed to a second tablet in the second table data structure; and
in response to the second request, using the tablet access object associated with the second tablet to perform a data access operation on the second tablet, and using the second application object associated with the second tablet to perform an additional computational operation to produce a result to be returned to the second client.

22. A system for accessing data, comprising:
in a set of interconnected computers:
memory;
a plurality of processors; and
one or more programs stored in the memory and configured for execution by the plurality of processors, wherein execution of the one or more programs by the plurality of processors causes the set of interconnected computers to perform operations, including:
storing a table data structure in a file system, the table data structure including a plurality of that correspond to distinct non-overlapping table portions;
storing software modules in a plurality of the interconnected computers, the software modules including a plurality of tablet access objects and a plurality of application objects, wherein a distinct application object is associated with each tablet access object, and each application object and the associated tablet access object are associated with and distinct from a respective tablet of the table data structure, wherein each application object corresponds to a distinct instantiation of an application associated with the table data structure, and at least one tablet of the plurality of tablets is stored on a different server than its associated tablet access object and application object;

after the storing of the table data structure and software modules, redistributing the tablet access objects and the associated application objects among the plurality of the interconnected computers in accordance with a first load-balancing criterion, wherein, after the redistributing, at least one tablet of the plurality of tablets is stored on a different computer of the interconnected computers than its associated tablet access object and application object;

after the redistributing, receiving a first request directed to a respective tablet from a client; and in response to the first request, using the tablet access object associated with the respective tablet to perform a data access operation on the respective tablet, and using the application object associated with the respective tablet to perform an additional computational operation to produce a result to be returned to the client, wherein the tablet access object associated with the respective tablet and used to perform the data access operation on the respective tablet is stored on a computer of the interconnected computers than the respective tablet.

23. A non-transitory computer readable storage medium storing one or more programs for use in accessing data, the one or more programs configured to be executed by a set of interconnected computers, wherein execution of the one or more programs by the set of interconnected computers causes the set of interconnected computers to perform operations comprising:

storing a table data structure in a file system, the table data structure including a plurality of tablets that correspond to distinct non-overlapping table portions;

storing, in a plurality of the interconnected computers, software modules, the software modules including a plurality of tablet access objects and a plurality of application objects, wherein a distinct application object is associated with each tablet access object, and each application object and the associated tablet access object are associated with and distinct from a respective tablet of the table data structure, wherein each application object corresponds to a distinct instantiation of an application associated with the table data structure, and at least one tablet of the plurality of tablets is stored on a different server than its associated tablet access object and application object;

after the storing of the table data structure and software modules, redistributing the tablet access objects and the associated application objects among the plurality of the interconnected computers in accordance with a first load-balancing criterion, wherein, after the redistributing, at least one tablet of the plurality of tablets is stored on a different computer of the interconnected computers than its associated tablet access object and application object;

after the redistributing, receiving a first request directed to a respective tablet from a client; and in response to the first request, using the tablet access object associated with the respective tablet to perform a data access operation on the respective tablet, and using the application object associated with the respective tablet to perform an additional computational operation to produce a result to be returned to the client, wherein the tablet access object associated with the respective tablet and used to perform the data access operation on the respective tablet is stored on a computer of the interconnected computers than the respective tablet.

* * * * *

UNITED STATES PATENT AND TRADEMARK OFFICE
CERTIFICATE OF CORRECTION

PATENT NO. : 9,870,371 B2  
APPLICATION NO. : 13/938126  
DATED : January 16, 2018  
INVENTOR(S) : Dean et al.

Page 1 of 1

It is certified that error appears in the above-identified patent and that said Letters Patent is hereby corrected as shown below:

In the Claims

Claim 22, Column 20, Line 61, please delete "of that" and insert --of tables that--;

Claim 22, Column 21, Line 30, please delete "a computer" and insert --a different computer--;

Claim 23, Column 22, Line 36, please delete "a computer" and insert --a different computer--.

Signed and Sealed this  
Third Day of April, 2018

Andrei Iancu  
*Director of the United States Patent and Trademark Office*